(12) United States Patent
Chmora et al.

(10) Patent No.: US 7,774,598 B2
(45) Date of Patent: Aug. 10, 2010

(54) METHOD OF MANAGING A KEY OF USER FOR BROADCAST ENCRYPTION

(75) Inventors: Andrey L. Chmora, Moscow (RU);
Alexey V. Urivskiy, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1295 days.

(21) Appl. No.: 11/285,294

(22) Filed: Nov. 23, 2005

(65) Prior Publication Data
US 2007/0079118 A1    Apr. 5, 2007

(30) Foreign Application Priority Data
Nov. 23, 2004   (KR) .................. 10-2004-0096497

(51) Int. Cl.
*H04L 29/06* (2006.01)
(52) U.S. Cl. .................. 713/163; 713/162; 713/150; 713/169; 709/245; 709/225; 709/226
(58) Field of Classification Search .......... 713/163, 713/162, 150, 169; 709/245, 225, 226
See application file for complete search history.

(56) References Cited

U.S. PATENT DOCUMENTS

| | | | | |
|---|---|---|---|---|
| 5,917,911 | A * | 6/1999 | Dabbish et al. | 380/286 |
| 7,043,024 | B1 * | 5/2006 | Dinsmore et al. | 380/278 |

* cited by examiner

*Primary Examiner*—Edan Orgad
*Assistant Examiner*—Roderick Tolentino
(74) *Attorney, Agent, or Firm*—Sughrue Mion, PLLC

(57) ABSTRACT

A method of managing a key of a user for a broadcast encryption. The method includes forming a tree comprising m hierarchies by repeating a process of setting a $i^{th}$ level comprising groups into which at least one node is grouped in a unit of $n_i$, and setting a $i+1^{th}$ level comprising the groups of the $i^{th}$ level that are re-grouped in a unit of $n_{i+1}$ until i is from "1" to "m". The method further includes mapping users on at least one node of the tree and message providers on the $m^{th}$ hierarchy, going down from the $m^{th}$ hierarchy to the first hierarchy to map key encryption keys with respect to the $i+1^{th}$ level connected to the $i^{th}$ level, and transmitting the message using the key encryption keys.

12 Claims, 8 Drawing Sheets

METHOD OF MANAGING A KEY OF USER FOR BROADCAST ENCRYPTION

CROSS-REFERENCE TO RELATED APPLICATIONS

This application claims priority from Korean Patent Application No. 2004-96497 filed Nov. 23, 2004, in the Korean Intellectual Property Office, the disclosure of which is incorporated herein by reference.

BACKGROUND OF THE INVENTION

1. Field of the Invention

Apparatuses and methods consistent with the present invention relate to broadcast encryption (BE), and more particularly, to managing a key of a user for a BE.

2. Description of the Related Art

Mobile communication industry operators and contents providers desire to control and transmit their contents to consumers using a predetermined method. A method of controlling consumption and distribution of digital media objects is referred to as digital rights management (DRM).

Open Mobile Alliance (OMA), which is a consortium established on June 2002 by global enterprises related to wireless devices and services such as Nokia, Intel, Vodafone, Microsoft, and Samsung Electronics to develop the standards of compatible wireless services and expand wireless services thereof, has made efforts to standardize DRM systems.

However, the OMA fails to offer a security service for protecting data confidentiality and authenticating devices of subscribers, and for revoking the devices of the subscribers and other devices, as necessary.

BE is a method of effectively transmitting information only to all users of a transmitter, i.e., a broadcast center, desires to transmit and must be effectively used in a case of arbitrary and dynamic changes of a set of users who are to receive information. In the BE, revocation or exclusion of undesired users, for example, illegal or expired users is the most important.

FIG. 1 is a view illustrating a network structure of a data transmitting system using a general BE. Referring to FIG. 1, a contents producer 100 produces various types of data including audio and video data and provides the various types of data to a service provider 110.

The service provider 110 broadcasts the various types of data received from the contents producer 100 to authorized users having paid for corresponding data, for example, a mobile DRM network 140 and a smart home DRM network 150, via various wire and wireless communication networks.

In particular, the service provider 110 may transmit the various types of data to a device of users such as a set-top box 141 including various satellite receivers via a satellite 120, and also to a mobile terminal 142 via a mobile communication network. Also, the service provider 110 may transmit the various types of data to terminals 150 through 155 of the smart home DRM network 150.

Here, the data is encrypted by BE so that an illegal user 160, who does not pay for corresponding data, cannot use the data.

The stability of an encryption and decoding system generally depends on a system managing an encryption key. A method of deriving the encryption key is important to the system. In addition, it is important to manage and update the encryption key.

BE has been changed since its introduction in 1991 and supposes stateless receivers at the present time. The concept of the BE means that secret keys of individual users are not changed or updated at all with a change of a session.

Here, "k-resilient" is used for stability and means that k users of excluded users cannot restore information in spite of their conspiring attacks. The symbol r generally denotes a number of excluded users. Thus, "r-resilient" means that information is safe from conspiring attacks of all of the excluded users.

In BE, a transmission overhead, a storage overhead, and a computation overhead are important. The transmission overhead denotes an amount of a header to be transmitted by a transmitter, the storage overhead denotes an amount of encryption keys to be stored by a user, and the computation overhead denotes a computation amount necessary for obtaining a session key via a user.

In particular, it is a great task to reduce the transmission overhead. The transmission overhead was, in the past, proportional to a total number N of users but is proportional to a number r of excluded users at the present time. A reduction of the transmission overhead to be less than the number r of excluded users is a great task to the BE with the introduction of schemes to allow the transmission overhead to be proportional to the number r of excluded users.

Based on the problems of the BE, "Subset Difference (SD) Method" published by Naor-Naor-Lotspiech shows the best result among announced results. In the SD method, if a total number of users is n, a storage overhead of $O(\log^{1+e} n)$ and a transmission overhead of $O(2r-1)$ are required.

However, the SD method cannot be used by a plurality of users in terms of efficiency.

As described above, since Berkovits first announced a paper on BE in 1991, various algorithms have been suggested. Secret sharing, a subset cover-free system model, a tree structure, and the like are important algorithms.

The secret sharing-based model was first suggested by S. Berkovits in 1991 and then improved in a paper entitled "Efficient Trace and Revoke Schemes" by M. Noar and B. Pinkas in 2000. In "How to Broadcast a Secret" by S. Berkovits, a polynomial interpolation method and a vector-based secret sharing method were suggested.

In the polynomial interpolation method, a center, i.e., a broadcast center or a transmitter, transmits points $(x_i, y_i)$ to individual users via a secret channel. Here, $x_i$ varies, and $(x_i, y_i)$ are secret keys of the individual users.

The center selects a polynomial P having a random integer j and a degree t+j+1 is selected to broadcast secret information S to t authorized users of each session. The polynomial P passes secret keys $(x_i, y_i)$ of the t authorized users and j random points (x, y) and (O, S) that are not secret keys of other users.

The center transmits t+j points and other points on the polynomial P. The t authorized users know about a point (their own secret keys) besides the t+j points and thus can restore the polynomial P having the degree t+j+1 and obtain the secret information S. However, the excluded users know only about the t+j points and thus cannot restore the polynomial P.

In the polynomial interpolation method, a transmission overhead is O(t+j+1), a storage overhead is O(1), and a computation overhead is about $t^3$ times. Also, revocation is easy, traitors can be prevented, and traitor tracing is possible. However, the polynomial interpolation method is inefficient for a large number of users. Also, in a case where the polynomial interpolation method is repeatedly used, the polynomial interpolation method is not safe. Thus, the polynomial interpolation method cannot be substantially used.

"Efficient Trace and Revoke Schemes" by M. Noar and B. Pinkas uses a threshold secret sharing method using a Lagrange's interpolation formula. In the method by Noar- Pinkas, r polynomial can be restored with r+1 points on the r polynomial, but not with r points.

In other words, the center selects a random t polynomial P and offers different points on the random t polynomial P to individual users. If r users are excluded, the center sums secret keys of the r users and randomly selected t-r points and then broadcasts information as to t points.

As a result, although the excluded users sum their secret information, they know only about the t points. Non-excluded users can know about t+1 points and thus restore the polynomial P. A session key value P(0) is obtained using the polynomial P.

In this method, revocation is easy, traitors can be prevented, and traitor tracking is possible. In particular, new users can be added, a transmission overhead is O(t), and a storage overhead is O(1). Thus, this method is considerably efficient.

However, in the case of this method, users more than t that are a first determined number cannot be excluded. In addition, a computation overhead necessary for computing a number of transmitted points or a polynomial depends on t. Thus, this method is inefficient in many cases. Moreover, as t becomes large, computation time is increased. Thus, it is difficult to use this method when a plurality of users are included.

In the subset cover-free system model, when a set of all users is S, a subset cover-free system is defined in a set whose members are subsets of the set S. If such a system is found, a BE can be performed using the system. However, a storage overhead and a transmission overhead are about O(r log n). Thus, the subset cover-free system model is inefficient.

Also, a method of expanding an l-resilient model into a k-resilient model was introduced. An 1-resilient scheme can be relatively easily invented. Thus, such an expansion appears meaningful. However, the efficiency of the 1-resilient scheme is greatly deteriorated during the expansion.

Methods using a tree structure have been recently noticed. C. K. Wong, M. Gouda, and G. S. Lam suggested a Logical-tree-hierarchy (LTH) in 1998. However, in the LTH, a large number of users cannot be excluded in a one-time session. Also, as a session goes by, secret keys of users are changed. Thus, the subset cover-free system model is distant from the BE supposing stateless receivers. Thereafter, D. Naor, M. Naor, and J. Lotspiech suggested "Complete Subset (CS) Cover Scheme" and "Subset Difference (SD) Scheme" in 2001.

On the supposition that a number of users is n and a number of excluded users is r in both methods, the center forms a binary tree having a height of log n and allots corresponding secret keys to all nodes. Also, the center allots users to leaf nodes one by one.

Describing the CS Cover scheme, each user receives secrete keys of all nodes positioned on a path from a root node to the user's leaf node from the center and stores the secrete keys. Here, a subtree not including excluded users is called a CS. If such CSs are appropriately collected, the CSs can include only non-excluded users.

Here, if a session key is encrypted with a secret key corresponding to a root node of used CSs and then transmitted, authorized users can restore the session key. However, since excluded users are not included in any CSs, the excluded users cannot restore the session key.

FIG. 2 is a view illustrating a BE allotting keys using a related art tree structure. Referring to FIG. 2, users 220 receiving data through a BE scheme have their own key values 32 through 47 and key values of nodes connected to them on a tree.

For example, a user 34 has his or her key value 34, a key value 209 of a node 17, a key value 204 of a node 8, a key value 202 of a node 4, and a key value 201 of a node 2. Here, the user 34 shares the key value 209 of the node 17 with a user 35. Also, users 32, 33, and 35 share the key value 204 of the node 8 with the user 34.

If the users 32 through 37 represent all authorized users, a header of data includes the key value 201 of the node 2 so that the key value 201 of the node 2 is equally transmitted to all of the authorized users. Thus, the data may be transmitted in security.

If a user having a key 221 of a user 36 is a revoked user, other users share key values of nodes related to the user 36. Thus, a process of updating the corresponding key values is required. In other words, key values 210, 205, 202, and 201 of the nodes 18, 9, 4, and 2 must be updated. Here, the key values are updated from a lower node to an upper node.

Since the user 37 shares the key value 210 of the node 18, an updated key value of the node 19 is encrypted as a key value of the user 37 and then transmitted to the user 37.

The user 37 and the users 38 and 39 under the node 19 share the key value 205 of the node 9. Thus, an updated key value of the node 9 is encrypted as the key value 210 of the node 18 that has been updated and then transmitted to the user 37, and the updated key value of the node 9 is encrypted as the key value 211 of the node 19 and then transmitted to the users 38 and 39.

The users 32, 33, 34, and 35 under the node 8 and the users 37, 38, and 39 under the node 9 share the key value 202 of the node 4. Thus, an updated key value of the node 4 is encrypted as the key value 204 of the node 8 and then transmitted to the users 32 through 35. Also, the updated key value of the node 4 is encrypted as the key value 205 of the node 9 and then transmitted to the users 37 through 39.

The users 32 through 39 under the node 4, except the user 36, and the users 40 through 47 under the node 5 share the key value 201 of the node 2. Thus, an updated key value of the node 2 is encrypted as the key value 202 of the node 4 that has been updated and then transmitted to the users 32, 33, 34, 35, 37, 38, and 39. Also, the updated key value of the node 2 is encrypted as the key value 203 of the node 5 and then transmitted to the users 40 through 47. Accesses of revoked users may be intercepted through such a key updating process.

In the above-described method, i.e., the CS model, a transmission overhead is O(r log(n/r)) that is a number of CSs including only non-excluded users, and a storage overhead is O(log n).

An SD model is a modification of the above-described CS model that requires a storage overhead of $O(\log^2 n)$ and a transmission overhead of O(2r−1) so as to improve the transmission overhead. The SD model considers a subtree obtained by subtracting a subtree having a node w of a subtree, having a node v as a root node, as a root node from the corresponding substree. Leaf nodes under this subtree are authorized users, and leaf nodes under the subtree having the node w as the root node are excluded users.

If excluded users are put among an appropriate number of authorized users, the SD model may require a subset unlike the CD model requiring two or more subsets.

In the SD model, hash values of keys allotted to nodes from the node v to the node w are obtained, and then values corresponding to the hash values are determined as session keys. Each user has hash values of sibling nodes of each node on a path from the user's node to a leaf node as secret keys. Therefore, only authorized users can restore session keys due to the one-way nature of a hash function. Here, in the SD model, a transmission overhead is O(2r−1), a storage overhead is $O(\log^2 n)$, and a computation overhead is O(log n).

An LSD model that is an improvement of the SD model was suggested in 2002. In the LSD model, a layer is used for each subtree to reduce a storage overhead to $O(\log^{3/2} n)$. However, a transmission overhead doubles that of the SD model.

Among the above-described BE models, the LSD or SD model using a tree structure shows the best efficiency. However, in the cases of the LSD or SD model using the tree structure, the number of subsets necessary for broadcasting greatly depend on positions of users. Thus, the LSD or SD model cannot be improved.

Also, considerable cost is required to maintain and mend the tree structure. Thus, more efficient BE schemes are required instead of the above-described tree structure.

In addition, stateless receivers must be considered at the present time. The stateless receivers are able to record past transmission histories and are changed depending on the states of the past transmission histories. The stateless receivers must operate based a current transmission and an initial setting.

SUMMARY OF THE INVENTION

An aspect of the present invention is to provide a method of managing a key of a user to realize a BE scheme using a binary cube based on a hierarchical structure.

According to an aspect of the present invention, there is provided a method of managing a key of a user for a broadcast encryption, including: forming a tree including m hierarchies by repeating a process of setting a $i^{th}$ level including groups, which contain $n_i$, at least one, nodes in a $i+1^{th}$ level and setting a $i+1^{th}$ level including groups, which are re-grouped $n_{i+1}$ nodes in the $i+1^{th}$ level until i is from "1" to "m"; mapping users on the at least one node of the tree and message providers on the $m^{th}$ hierarchy; going down from the $m^{th}$ hierarchy to the second hierarchy to map key encryption keys with respect to every node of the $i+^{th}$ level; and transmitting the message using the key encryption keys.

The mapping of the key encryption keys may include: forming a matrix having a binary vector having a binary factor of a number of the groups of the $i+1^{th}$ level as a row and the $i+1^{th}$ level as a column; mapping virtual users on the node and key encryption keys in each of columns; detecting the virtual users including unauthorized users on a lower level to remove key encryption keys of the virtual users from the matrix; and selecting key encryption keys of the users remaining on the matrix after the key encryption keys of the virtual users are removed from the matrix.

The removing of the key encryption keys of the virtual users from the matrix may include: removing a column of the matrix corresponding to the virtual users including the unauthorized users on the lower level and a row corresponding to a determined one of values "0" and "1" of the removed column.

The node may be an apparatus receiving the contents via a wireless network.

In the mapping key encryption keys, the key encryption keys may be mapped from the $m^{th}$ hierarchy to a second hierarchy.

The transmitting of the message using the key encryption keys may include: encrypting a session key using the key encryption keys; and adding the encrypted session key to a header to transmit the encrypted message using the encrypted session key.

The transmitting of the message using the key encryption keys may further include: adding a test block that is a session key encrypted using the session key to the header.

The method may further include: receiving and decoding the message via the users, The decoding of the message may include: decoding the encrypted session key using a key encryption key of the users to generate a candidate session key; decoding the encrypted session key of the test block using the candidate session key and comparing the decoded session key with the candidate session key; and if the decoded session key is equal to the candidate session key, determining the candidate session key as a session key of the text block and decoding the message.

BRIEF DESCRIPTION OF THE DRAWINGS

The above and other aspects of the present invention will be more apparent by describing exemplary embodiments of the present invention with reference to the accompanying drawings, in which.

DETAILED DESCRIPTION OF THE EXEMPLARY EMBODIMENTS

Figure 1:
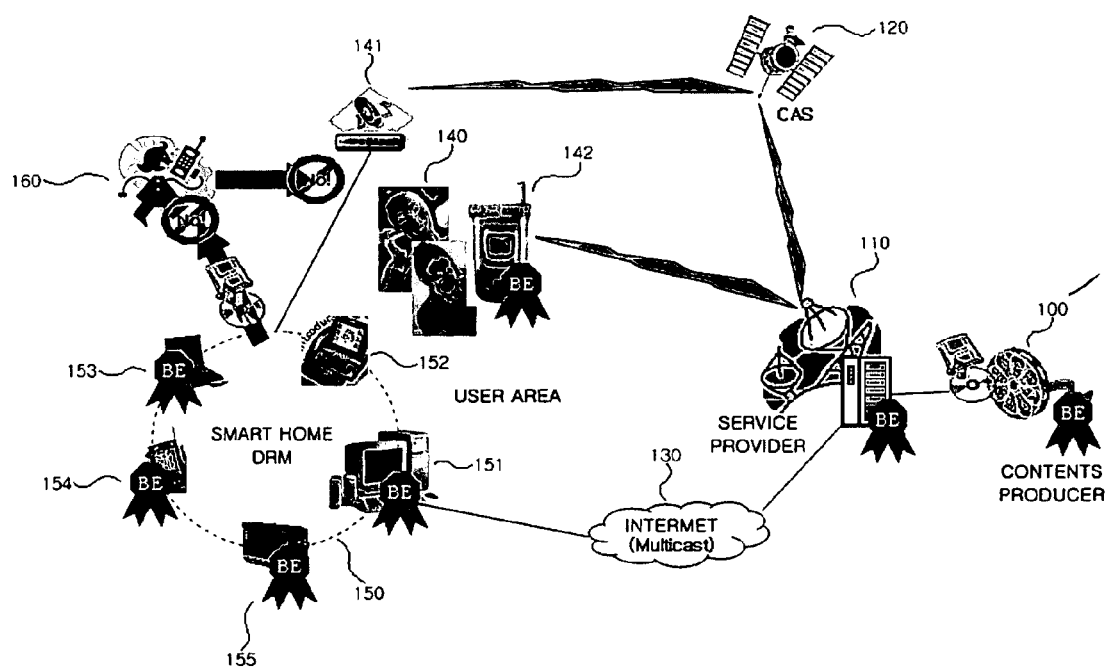
FIG. 1 is a view illustrating a network structure of a data transmission system using a general BE.
Figure 2:
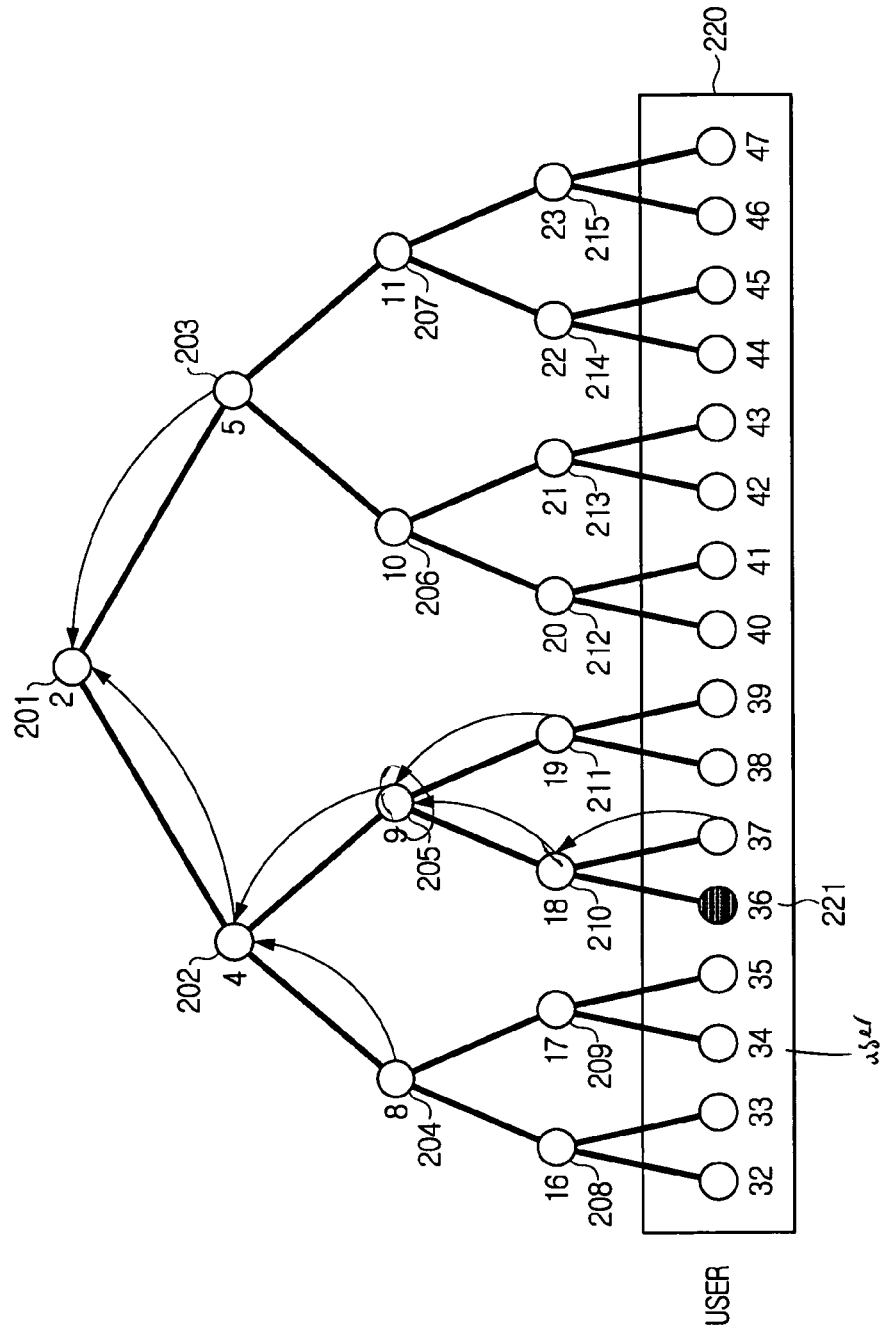
FIG. 2 is a view illustrating a BE allotting keys using a related art tree structure.

Hereinafter, certain exemplary embodiments of the present invention will be described in greater detail with reference to the accompanying drawings.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Hereinafter, users and nodes will be used as the same concept.

Figure 3:
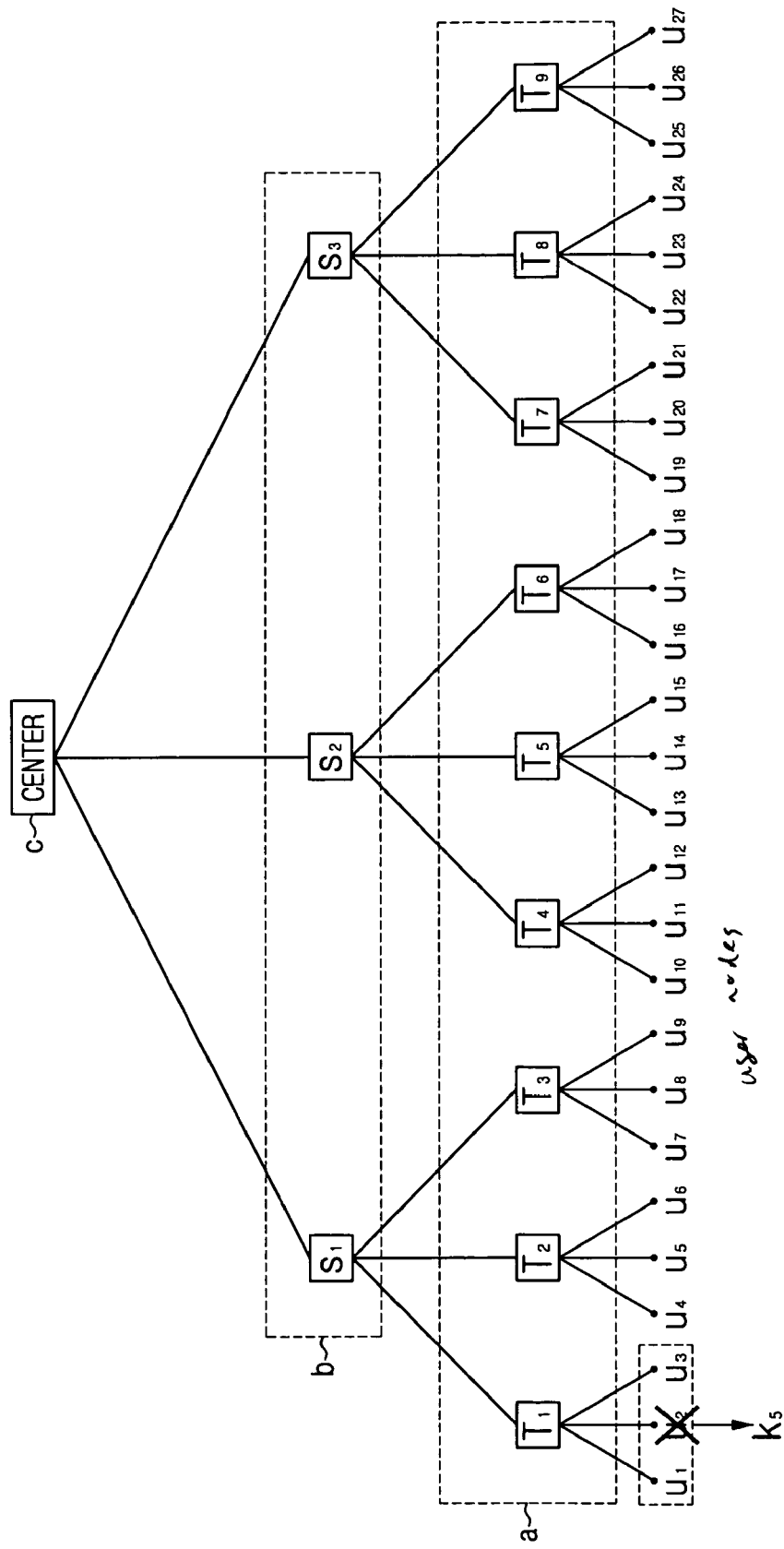
FIG. 3 is a view illustrating a method of managing a key of a user for a BE according to an exemplary embodiment of the present invention.

FIG. 3 is a view illustrating a method of managing a key of a user for a BE according to an exemplary embodiment of the present invention.

The method of managing the key of the user according to the present invention includes a binary-CUbes-based Broadcast Encryption Scheme (CuBES) as a BE scheme based on a virtual tree structure to manage a key. The tree structure forms a logical hierarchical structure.

Nodes ranging from an uppermost hierarchy (hereinafter referred to as a center) to a lowermost hierarchy are not substantial nodes but logical nodes. The lowermost hierarchy of the tree structure includes user nodes (hereinafter referred to as users). The users include users unauthorized to be provided with contents or massages, i.e., revoked users.

The messages are provided from the center to the users, and contents to be provided are encrypted by a session key. The session key is encrypted by KEKs of which only the center and the users know.

The session key must be transmitted to users authorized to use the corresponding contents, and the method of managing the key according to the present invention is used to allot keys. Hereinafter, a set of KEKs is called a key block in a user area.

The method of managing the key according to the present invention may be based on a binary cube.

Hereinafter, the binary cube will be first described, and then the method of managing the key according to the present invention will be described with reference to FIG. 3.

The allocation of keys may be represented by an incidence matrix. It is supposed that a network includes N users and the center includes K keys. Users are denominated an exponent j ($j=1, \ldots, N$). Keys are denominated an exponent i ($i=1, \ldots, K$).

Here, a K×N binary matrix $A=[a_{ij}]$ may be formed. Here, a column corresponds to keys, and a row corresponds to users according to the following rules. If a $j^{th}$ user possesses an $i^{th}$ key, $a_{ij}=1$. If the $j^{th}$ user does not possess the $i^{th}$ key, $a_{ij}=0$. A matrix A shown in Table 1 is referred to as an incidence matrix.

TABLE 1

|       | $u_1$ | $u_2$ | $u_3$ |
|-------|-------|-------|-------|
| $k_1$ | 1     | 0     | 0     |
| $k_2$ | 0     | 1     | 0     |
| $k_3$ | 0     | 0     | 1     |
| $k_4$ | 1     | 1     | 0     |
| $k_5$ | 1     | 0     | 1     |
| $k_6$ | 0     | 1     | 1     |
| $k_7$ | 1     | 1     | 1     |

The matrix shown in Table 1 corresponds to a case where seven keys are allotted to each of three users. The three users each have four keys. In particular, a user $u_1$ has keys $k_1, k_4, k_5$, and $k_7$ in advance according to a predetermined method.

If some users are revoked, the center revokes the column coinciding with the revoked users and rows annexed to the rows. Thereafter, the center must use keys corresponding to the remaining rows to broadcast massages.

In this case, at least one or more sets of keys covering remaining users may exist. Any set is possible. A set having the smallest size may be detected to reduce transmission overhead.

For example, if a user $u_2$ is revoked, the center revokes a second column and second, fourth, sixth, and seventh rows related to the second column. Table 2 below shows the results of the revocation.

TABLE 2

|       | $u_1$ | $u_3$ |
|-------|-------|-------|
| $k_1$ | 1     | 0     |
| $k_3$ | 0     | 1     |
| $k_5$ | 1     | 1     |

Five keys for users in two remaining columns, i.e., five sets of rows of the incidence matrix, exist. The five sets are {5}, {1,3}, {1,5}, {3,5}, and {1,3,5}. A set having the smallest size includes a fifth row. Thus, the center may use a key $k_5$ to broadcast messages to users $u_1$ and $u_3$.

The set having the smallest size covering all authorized users such as {5} is referred to as a coverage. Rows of the coverage cover all of the authorized users.

Here, each row shown in Table 1 is called a binary cube. The binary cube may be a binary vector $x=(x_1, x_2, \ldots, x_n)$ having a length n with respect to n users and includes $2^n$ vectors. A set of such vectors is referred to as an n power binary cube.

If all n binary cubes are rows of the incidence matrix except that all vectors are "0," a BE scheme is given by a binary matrix having $2^n$ rows and n columns.

A size of the coverage may be accurately "1", independent from how many users are revoked. If r users $u_1, u_2, \ldots,$ and $u_r$ are revoked, an $N^{th}$ row in which "0" is in positions of $i_1, i_2, \ldots,$ and $i_r$, and "1" is are in the other positions, covers all columns except $i_1, i_2, \ldots,$ and $i_r$. A coverage having a size of "1" is given. Rows coinciding with any one of the r users may be detected. In other words, a key for remaining users may be detected.

If at least one row is deleted from the incidence matrix generated from the n binary cubes, sets of revoked users requiring a coverage having a size of "2" or more may exist.

Key management can be achieved using the incidence matrix generated by the n binary cute. Binary cubes define an optimum BE scheme from the viewpoint of a transmission overhead. However, a size of a key block that is a set of KEKs of a user is very quickly increased. If a network includes N users, the network includes $2^N-1$ keys. Also, all of the N users each have $2_N-1$ keys. A number, N, of such keys may be "10" that is considerably large. It may be impossible to use N>64 binary cubes.

To solve these problems, the present invention uses a logical hierarchy. In this case, the logical hierarchy has a tree structure. The tree structure will be described with reference to FIG. 3.

Referring to FIG. 3, a tree includes 27 users $u_1$ through $u_{27}$. In other words, the number N of users is "27." The user $u_2$ is a revoked user. The tree shown in FIG. 3 forms hierarchical trees on a predetermined number of levels between the users $u_1$ through $u_{27}$ and a center c.

The lowermost level forms groups of a predetermined number $n_1$ of users. Users are grouped in the unit of $n_1$ to form groups $T_1$ through $T_9$ that are each a node. A hierarchical level of the groups $T_1$ through $T_9$ is referred to as a first level a. A BE scheme based on $n_1$ binary cubes is formed for each of the groups $T_1$ through $T_9$ of the first level a. The first level a may include $N/n_1$ groups. As shown in FIG. 3, since N=27, and $n_1=3$, the first level a includes nine groups.

The groups $T_1$ through $T_9$ of the first level a are grouped by supposing a predetermined number $n_2$ of groups as one user using the grouping method for the first level a. Groups $s_1$ through $s_3$ of an upper level that are new nodes are formed due to such grouping. The upper level including the groups $s_1$ through $s_3$ is referred to as a second level b.

The uppermost level includes a predetermined number $n_3$ of groups thereunder based on the center c.

The number of levels of a network may vary depending on the size of a number N of all users and the numbers $n_1$ and $n_2$ grouped on the first and second levels a and b. If m trees are formed, the number N of all users is $n_1 \times n_2 \times \ldots \times n_m$.

If a hierarchical tree is formed, the BE scheme of the present invention using the incidence matrix generated by the n binary cubes is performed with respect to each level.

Figure 4:
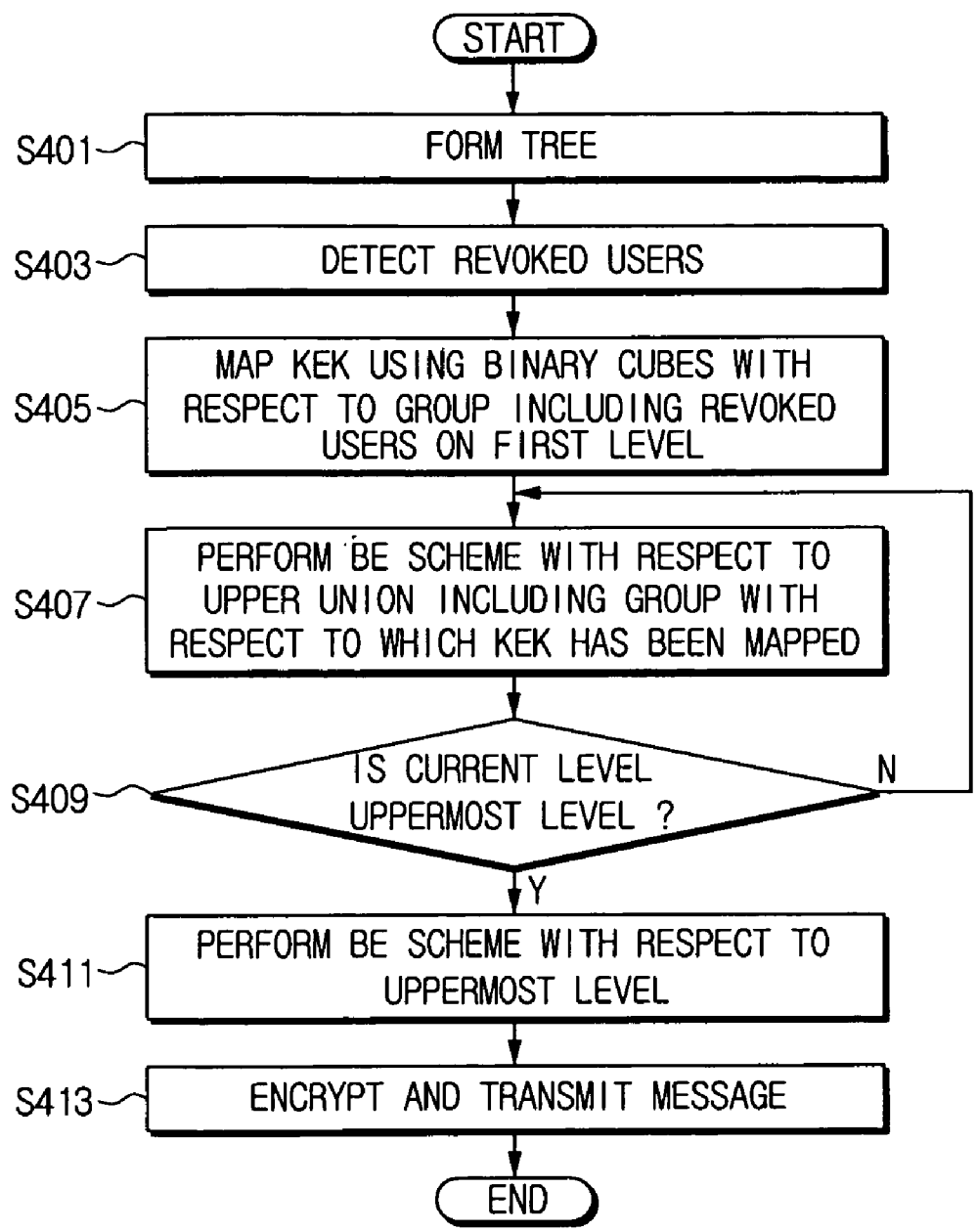
FIG. 4 is a flowchart of a method of managing a key of a user for a BE according to an exemplary embodiment of the present invention.

FIG. 4 is a flowchart of a method of managing a key of a user for a BE according to an exemplary embodiment of the present invention. The method of managing the key of the user according to the present invention will now be described with reference to FIGS. 3 and 4.

If a tree is formed to allocate keys based on a network including all users in operation S401, the center c detects revoked users in operation S403.

The center c determines KEKs with respect to a group of the first level a including the revoked users using the incidence matrix. The center c performs a BE scheme with respect to the group $T_1$ from which the user $u_2$ has seceded, that is, user $u_2$ is not authorized to access data. The BE scheme is performed using 3 power binary cubes. Thus, in Tables 1 and 2, the key $k_5$ is determined as a KEK for the users $u_1$, $u_2$, and $u_3$ of the group $T_1$. In other words, if an encrypted session key is transmitted with the key $k_5$ and an encrypted message is transmitted with the session key, the users $u_1$ and $u_3$ each have the key $k_5$ and thus can decode the message. However, the user $u_2$ does not have the key $k_5$ and thus, cannot decode the message. This process is performed with respect to all of groups of the groups of the first level a including the revoked users. In operation S405, the coverage includes KEKs.

The center c performs the BE scheme respect to an upper group including the groups (groups including the revoked users) with respect to which the KEKs have been mapped. As shown in FIG. 3, $S^1$ corresponds to the upper group, and the BE scheme is performed with respect to the upper group using 3 power binary cubes. Since the KEKs are mapped with respect to the group $T_1$, new KEKs are mapped only with respect to the groups $T_2$ and $T_3$ and then added to the coverage.

Figure 5:
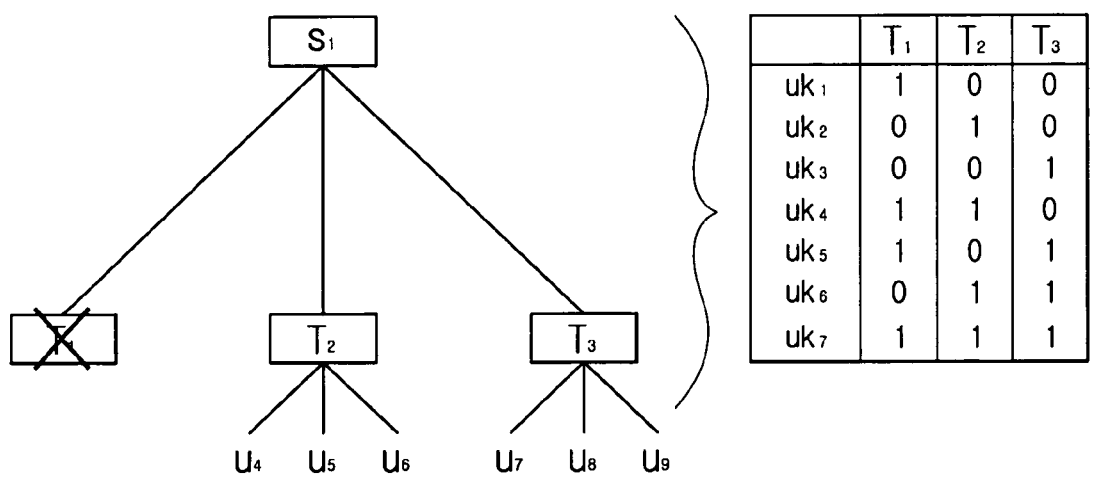
FIG. 5 is a view illustrating a method of mapping key encryption keys (KEKs) on an uppermost level according to an exemplary embodiment of the present invention.

FIG. 5 is a view illustrating a method of managing a key of an upper group whose members are groups including revoked users. Here, the center c removes the group $T_1$ mapped from the 3 power binary cubes. Thus, the coverage is a group including only a key $uk_6$. In other words, the key $uk_6$ is mapped as a KEK for the groups $T_2$ and $T_3$.

In operation S407, the center c performs the BE scheme with respect to all of upper groups including groups having mapped KEKs thereunder.

In operation S409, the center c determines whether a current level is an uppermost level. If the center c determines in operation S409 that the current level is not the uppermost level but includes a predetermined number m of levels, the center c repeats operation S407 with raising levels until the current level is the uppermost level.

If the center c determines in operation S409 that the current level is the uppermost level, the center c performs the BE scheme to allocate KEKs to groups with respect to which KEKs have not been mapped, i.e., groups not including revoked users thereunder.

Figure 6:
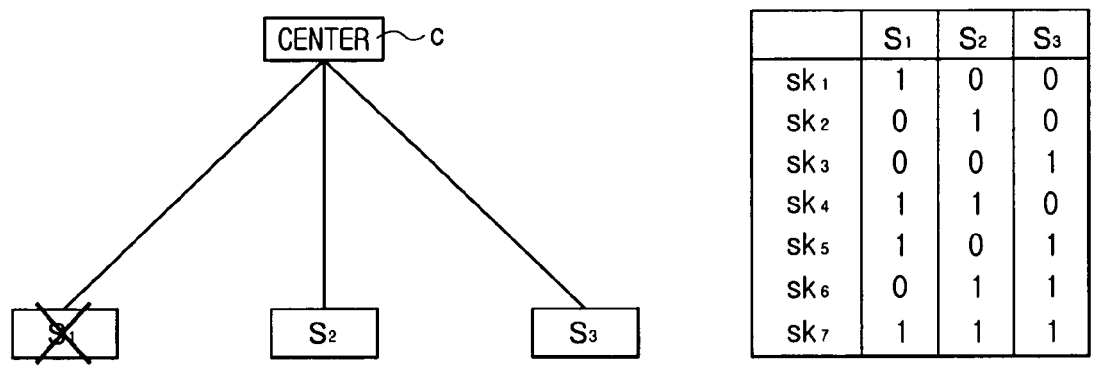
FIG. 6 is a view illustrating a method of mapping KEKs on an uppermost level according to another exemplary embodiment of the present invention.

FIG. 6 is a view illustrating a method of mapping KEKs on an uppermost level. Here, the center c allocates KEKs to groups $s_2$ and $s_3$ except a group $s_1$ with respect to which KEKs have been mapped, using the same method as that performed in operation S405 or 407. Thus, the center c maps a key $sk_6$ as a KEK for the groups $s_2$ and $s_3$ (accurately, users under the groups $s_2$ and $s_3$) and then adds the KEK to a coverage.

A group finally mapped by the center c does not include a group with respect to which KEKs are mapped or users thereunder regardless of the number of levels. In other words, in operation S411, the group does not include revoked users thereunder.

In operation S413, the center c transmits an encrypted message including information as to a coverage including all of mapped KEKs to users.

The method of managing the key of the user according to the present invention is performed according to the above-described exemplary method.

According to another aspect of the present invention, KEKs may be mapped in an opposite direction to a direction along which the coverage is obtained as described with reference to FIG. 4.

Figure 7:
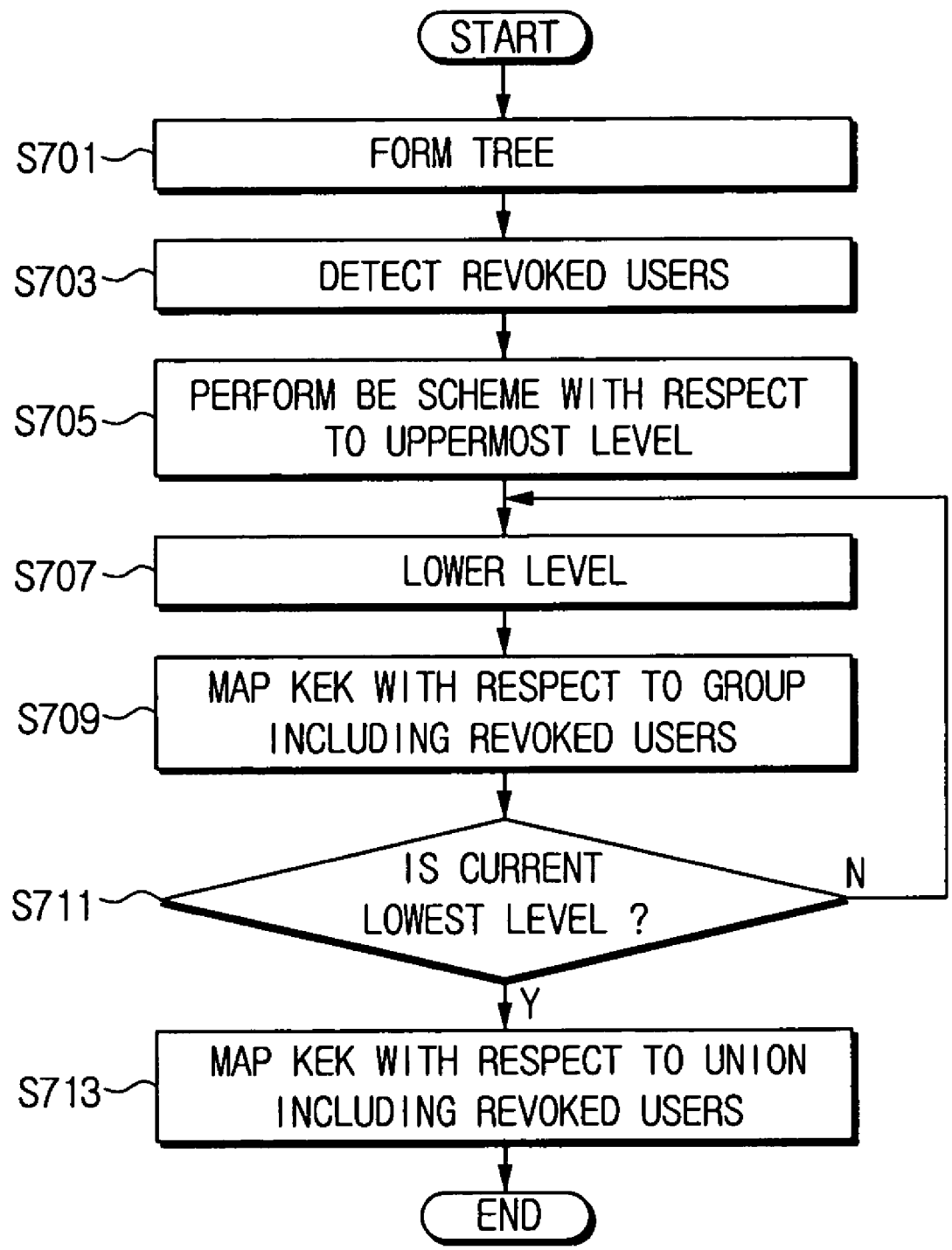
FIG. 7 is a flowchart of a method of managing a key of a user for BE according to another exemplary embodiment of the present invention.

FIG. 7 is a flowchart of a method of managing a key of a user for a BE according to another exemplary embodiment of the present invention.

In operation 701, a tree is formed to allocate keys based on a network including all users. In operation S703, a center c detects revoked users.

If the revoked users do not exist, the center c encrypts a session key using a specific key defined for an entire network at the top of a hierarchical tree. If at least one user secedes from the network, a coverage may be detected from an uppermost level of the hierarchical tree. The uppermost level includes $n_m$ lower groups. The center c detects groups not including revoked users from lower levels. The center c maps a KEK that is a key for the groups. If users secede from all groups, any KEK does not need to be added to the coverage. In operation S705, a BE scheme is performed with respect to the uppermost level as described with reference to FIG. 6.

In operation 707, the center c goes down a level.

The center c detects a group $s_1$ including a lower group $T_1$ including at least one revoked user from a corresponding level (a first level). The lower group $T_1$ is divided into $n_{m-1}$ groups. The lower group $T_1$ corresponds to the group $s_1$ shown in FIG. 3. In operation S709, a KEK for the detected group $s_1$ is added to the coverage. This corresponds to the description of FIG. 5.

In operation S711, the center c determines whether a current level is a lowermost level. If the center c determines in operation S711 that the current level is not the lowermost level, the center c lowers a level to repeat operations S707 and S709.

The center c performs a BE scheme with respect to each of groups including one or more revoked users on the lowermost level. In operation S713, a KEK is added to the coverage for all of users of the groups including the one or more revoked users. This corresponds to the selection of the key $k_5$ described with reference to FIG. 3.

The method of managing the key of the user according to the present invention may be performed using the above-described exemplary method.

According to the present invention, a number, $K_{Bt}$, of keys of a key block of a user may be expressed as in Equation 1:

$$K_{Bt} = \sum_{i=1}^{m} 2^{ni-1}$$

The number of keys a user requires is slightly smaller than the key $K_{Bt}$. Considering $i^{th}$ and $i+1^{th}$ levels, the user detects two keys corresponding to a row "(1, 1, 1, . . . , 1)" of the $i^{th}$ level and a row "1, 0, 0, . . . , 0" of the $i+1^{th}$ level from an incidence matrix. The two keys are exclusive to a group and all of users of the group. Both of the two keys do not need to be stored. It is sufficient to store only one of the two keys.

In brief, one of the two keys is left on the $i+1^{th}$ level. The other one is revoked from the ih level. Rows having values of "1" are all revoked from the incidence matrix to describe the above example the best. Thus, it is supposed that an incidence matrix generated by n power binary cubes for a BE includes $2_n$ 2 binary rows of binary rows having a length n except binary rows having values of "1" or "0."

If revoked users do not exist, rows all having values of "1" are added to an uppermost node of the tree to broadcast a message using only a key.

In summary, a number, $K_{ut}$, of keys all of N users must have for a network including the N users may be expressed as in Equation 2:

$$K_{Ut} = \sum_{i=1}^{m} (2^{ni-1} - 1) + 1$$

wherein $N = n_1 \times n_2 \times \ldots \times n_m$.

A BE scheme based on binary cubes is called as a CuBES.

A method of encrypting and transmitting a message using a CuBES will now be described.

In the CuBES, the message transmitted from the center includes two parts. The second part is information (media) encrypted with a session key. The first part called a header includes information a user requires to obtain a session key.

Figure 8:
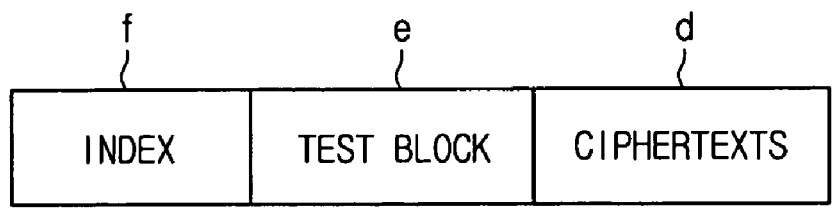
FIG. 8 is a view illustrating a structure of a header of a massage according to an exemplary embodiment of the present invention.

FIG. 8 is a view illustrating a structure of a header of a message according to an exemplary embodiment of the present invention.

Cipher texts d are session keys whose fields are encrypted with KEKs.

A test block e is to check whether a user accurately receives a session key.

An index f is a pointer for a KEK used for a message and gives information as to which ciphertexts the user must detect from the ciphertexts d to obtain a session key.

Each part of the header and processes of forming each part of the header via a center and analyzing each part of the header via a user will now be described.

The index f indicates whether a user has seceded. If the user has not seceded, the index f includes information as to which ciphertexts must be restored to obtain a session key. When the center c knows about a coverage, a process of decoding this information in the index f is required.

The index f includes $N/(n_1 \times n_2)$ records having the same length. $n_1 \times n_2$ denotes a number of users belonging to a group of the second level b of the tree. A maximum number, $n_2$, of keys are required to include a set of users who have seceded from this group.

Ciphertexts d (hereinafter referred to as a bundle) of the session key encrypted by KEKs in a coverage coinciding with a group of the second level b are consecutively positioned in the ciphertexts d of the header without inserting a key allotting a gap or another group. Also, since lengths of all of ciphertexts d are the same, it is easy to restore arbitrary ciphertexts d of which numbers are known.

A record of the index f will now be described.

A first part of the record indicates a number of a key from which a bundle starts. If the coverage includes L keys, all of the L keys have their own numbers from "0" to "L−1. Thus, bits of $\log_2 L$ are required to write a number of given keys.

A second part of the record is a row of an incidence matrix of groups give from a second level. The row of the incidence matrix defines how many keys the bundle includes. In other words, if a Hamming weight of the incidence matrix of the groups give from the second level is w, $n_2 - w + 1$ keys are required. A length of the second part is $n_2$ bits.

In summary, a whole length $I_s$ of the index f is expressed as in Equation 3:

$$I_x = \frac{N}{n_1 n_2}(\log_2 L + n_2)$$

Decoding of the test block e and the session key will now be described.

Orders are put to keys of the bundle to easily obtain a session key easy. A first ciphertext corresponds to a first group of groups of $n_1$ users from which users have seceded. A second ciphertext corresponds to a second group. The third through last ciphertexts respectively correspond to the third through the last groups in this way. The last ciphertext of the bundle corresponds to a group not including revoked users.

If the bundle includes only one ciphertext, it is clear that the group does not include revoked users. Also, this ciphertext is a session key encrypted by a KEK obtained form a BE scheme of 3 or more levels using a BE scheme.

If at least one user has seceded from the group, the bundle has two or more ciphertexts. The last ciphertext of the bundle is obtained through a KEK obtained by a BE scheme of the second level. The other ciphertexts of the bundle are obtained through a KEK obtained from a BE scheme of the first level of the tree.

Due to applied indexing, users do not receive as many KEKs as KEKs by which the session key is encrypted. Instead, the users receive an indication of what a BE having such KEKs is.

There are three cases in this exemplary embodiment. In other words, KEKs may belong to BE schemes of first and second levels. Alternatively, the KEKs may belong to a BE scheme of a third level or BE schemes of other levels.

In the first case, a user must try $2^{(n1-1)}-1$ keys. In the second case, the user must try $2^{(n2-1)}-1$ keys. In the third case, the user must try the following keys.

$$\text{Number of Tries} = \sum_{i=3}^{m} 2^{(n_i-1)} - l + 3$$

The header includes the text block e to accurately select a KEK and obtain a session key. The text block e is a session key K encrypted through itself. In other words, Test=$E_K(K)$ where a function $E_k(K)$ means that data k is encrypted by a key k.

A process of decoding a session key will now be described with reference to FIG. 9.

Figure 9:
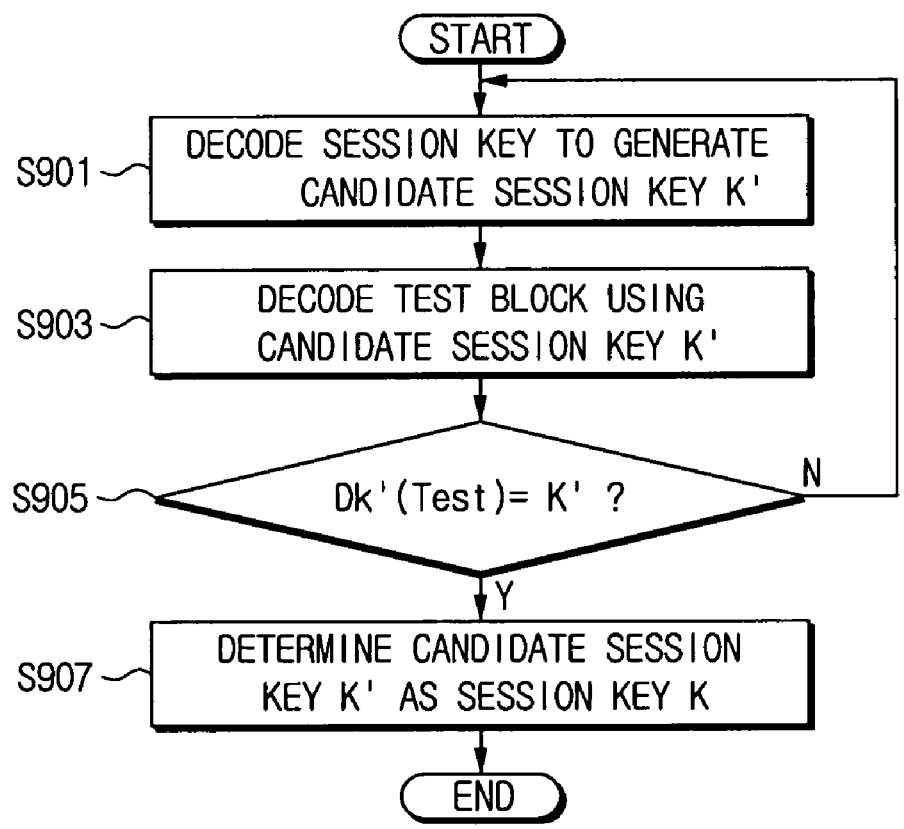
FIG. 9 is a flowchart of a process of decoding a session key in a method of managing a key of a user for BE according to an exemplary embodiment of the present invention.

FIG. 9 is a flowchart of a process of decoding a session key in a method of managing a key of a user for BE according to an exemplary embodiment of the present invention.

A user consecutively tries to decode a session key using possible KEKs obtained from corresponding BE schemes. In operation S901, the user generates a candidate session key K' in each try.

In operation S903, the user decodes a test block using the candidate session key K'. In operation S905, the user checks whether $DK_{K'}(\text{Test})=K'$.

If the user determines in operation S903 that $D_{K'}(\text{Test})=K'$, in operation S907, the user determines that K=K'. If the user determines in operation S903 that $D_{K'}(\text{Test}) \neq K'$, the user repeats operations S901, S903, and 905 to try a next possible KEK. Thus, one-time try requires two-time decoding.

A number of tries to decode the session key is limited as in Equation 5:

$$\text{Number of Tries of Decoding} = 2X \max\left(2^{n_1-1} - 1, 2^{n_2-1} - 1, \sum_{i=3}^{m} 2^{(n_i 3 - 1)} - l + 3\right)$$

The session key is decoded according to the above-described method.

According to such CuBES scheme, a number of keys to be stored is large on the part of users compared to the related art. However, a transmission overhead can be remarkably reduced. The remarkable reduction in the transmission overhead can be achieved by reducing a number of encrypted session keys of a header.

Figure 10:
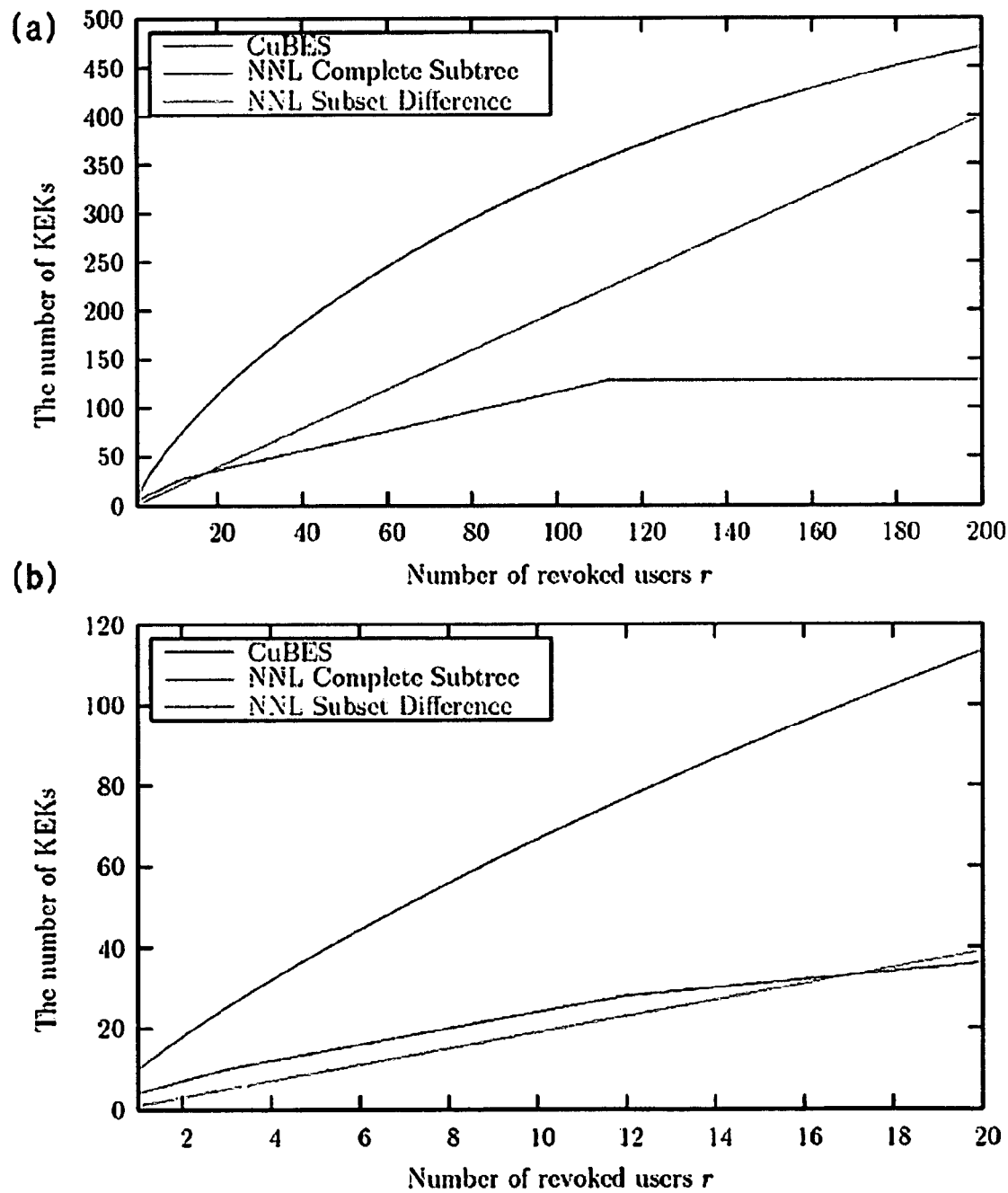
FIGS. 10A and 10B are graphs illustrating a performance of a method of managing a key of a user for BE according to an exemplary embodiment of the present invention.

FIGS. 10A and 10B are graphs illustrating a performance of a method of managing a key of a user for BE according to an exemplary embodiment of the present invention.

FIGS. 10A and 10B illustrate cases where a number N of users is $2_{20}$. In this case, according to the CuBES of the present invention, a user must have 304 keys. According to a NNL Complete Subtree scheme, a user must have 21 keys. According to a NNL Subset Difference, a user must have 211 keys.

Referring to FIGS. 10A and 10B, horizontal axes denotes denote a number, r, of revoked users, and vertical axes denote a number of transmitted KEKs of a header. As the number of KEKs is large, a transmission overhead is increased. FIGS. 10A and 10B are based on a number r of revoked users.

Referring to FIGS. 10A and 10B, in the present invention, the transmission overhead is greatly improved compared to the related art.

As described above, according to the present invention, only authorized users can decode and use contents. Unauthorized users cannot decode the contents, nor can the contents be decoded by conspiring attacks of users.

Compared to the related art, system resources of a center or a user can be minimized, and a transmission overhead can be minimized.

Also, although a new user is subscribed or revoked, a network can be maintained by an existing key.

The present invention can be implemented in several forms, including as a method, an apparatus, and a system. When the present invention is implemented in software, its component elements are code segments that execute necessary operations. Programs or code segments can be stored in processor readable media and can be transmitted via a computer data signal that is combined with a carrier wave in a transmission medium or in a communication network. The processor readable medium can be any medium that can store data. Examples of the processor readable medium include electronic circuits, semiconductor memory devices, ROMs, flash memories, erasable ROMs (EROMs), floppy disks, optical disks, hard disks, etc. The computer data signal can be any signal that can be transmitted via transmission media, such as electronic network channels, optical fibers, air, an electronic field, RF networks, etc.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of a broadcast apparatus for managing a key of a user for a broadcast encryption, the method comprising:
   forming a tree including m hierarchies by repeating a process of setting an $i^{th}$ level including groups into each of which at least one node is grouped in a unit of $n_i$, and setting a $i+1^{th}$ level comprising groups into each of which the groups of the $i^{th}$ level are grouped in a unit of $n_{i+1}$, where i is from 1 to m−1, and users are mapped on nodes of the $1^{st}$ level and a message provider is mapped on the $m^{th}$ level;
   detecting a revoked user among the users;
   mapping a key encryption key with respect to at least one group of the groups of the $m^{th}$ level, the at least one group not including the revoked user;
   going down from the $(m-1)^{th}$ level to the $1^{st}$ level for mapping key encryption keys with respect to a group of each level from the $(m-1)^{th}$ level to the $1^{st}$ level, the group of each level including the revoked user; and
   transmitting, by the broadcast apparatus, a message using the key encryption keys,
   wherein the mapping of the key encryption keys comprises:
   forming a matrix having columns corresponding to groups of a level of the hierarchies and rows corresponding to a number of keys;
   mapping virtual users and key encryption keys in the matrix;
   detecting a virtual user comprising a unauthorized user on a lower level to remove key encryption keys of the detected virtual user from the matrix; and
   selecting key encryption keys of the users remaining on the matrix after the key encryption keys of the detected virtual user are removed from the matrix.

2. The method of claim 1, wherein the removing of the key encryption keys of the detected virtual user from the matrix comprises:
   removing a column of the matrix corresponding to the detected virtual user comprising the unauthorized user on the lower level and a row corresponding to a determined one of values 0 and 1 of the removed column.

3. The method of claim 1, wherein the node is an apparatus receiving contents via a wireless network.

4. The method of claim 1, wherein the key encryption keys are mapped by using an incidence matrix.

5. The method of claim 1, wherein the transmitting of the message using the key encryption keys comprises:
   encrypting a session key using the key encryption keys; and
   adding the encrypted session key to a header to transmit the encrypted message using the encrypted session key.

6. The method of claim 5, wherein the transmitting of the message using the key encryption keys further comprises adding a test block that is a session key encrypted using the session key to the header.

7. The method of claim 6, further comprising receiving and decoding the message via the users excluding the evoked user.

8. The method of claim 7, wherein the decoding of the message comprises:
   decoding the encrypted session key using a key encryption key of the users to generate a candidate session key;
   decoding the encrypted session key of the test block using the candidate session key and comparing the decoded session key with the candidate session key; and
   if the decoded session key is equal to the candidate session key, determining the candidate session key as a session key of the text block and decoding the message.

9. The method of claim 8, wherein a session key of the text block is decoded depending on position information of the encrypted session key added to the header to generate the candidate session key.

10. A non-transitory computer readable medium for managing a key of a user for a broadcast encryption, the computer readable medium including instructions, which when executed comprise:

forming a tree including m hierarchies by repeating a process of setting an ith level including groups into each of which at least one node is grouped in a unit of ni, and setting a i+1th level comprising groups into each of which the groups of the ith level are grouped in a unit of ni+1, where i is from 1 to m−1 and users are mapped on nodes of the 1st level and a message provider is mapped on the mth level;

detecting a revoked user among the users; mapping a key encryption key with respect to at least one group of the groups of the mth level, the at least one group not including the revoked user; going down from the (m−1)th level to the 1st level for mapping key encryption keys with respect to a group of each level from the (m−1)th level to the 1st level, the group of each level including the revoked user; and transmitting a message using the key encryption keys wherein the mapping of the key encryption keys comprises: forming a matrix having columns corresponding to groups of a level of the hierarchies and rows corresponding to a number of keys; mapping virtual users and key encryption keys in the matrix; detecting a virtual user comprising a unauthorized user on a lower level to remove key encryption keys of the detected virtual user from the matrix; and selecting key encryption keys of the users remaining on the matrix after the key encryption keys of the detected virtual user are removed from the matrix.

11. A method of a broadcast apparatus for managing a key of a user for a broadcast encryption, the method comprising:

forming, a tree including m hierarchies by repeating a process of setting an $i^{th}$ level including groups into each of which at least one node is grouped in a unit of $n_i$, and setting a $i+1^{th}$ level comprising groups into each of which the groups of the $i^{th}$ level are grouped in a unit of $n_{i+1}$, where i is from 1 to m−1, and users are mapped on nodes of the $1^{st}$ level and a message provider is mapped on the $m^{th}$ level;

detecting a revoked user among the users;

mapping a key encryption key with respect to a group of the $1^{st}$ level, the group of the $1^{st}$ level including the revoked user, wherein the mapping of the key encryption key comprises removing the revoked user among the users based on a result of the detecting;

going from the $2^{st}$ level to the $m^{th}$ level of the m hierarchies for mapping key encryption keys with respect to at least one group of each level from the $2^{nd}$ level to the $m^{th}$ level; and transmitting, by the broadcast apparatus, a message using the key encryption keys, wherein the mapping of the key encryption keys comprises:

forming a matrix having columns corresponding to groups of a level of the hierarchies and rows corresponding to a number of keys;

mapping virtual users and key encryption keys in the matrix;

detecting a virtual user comprising a unauthorized user on a lower level to remove key encryption keys of the detected virtual user from the matrix; and selecting key encryption keys of the users remaining on the matrix after the key encryption keys of the detected virtual user are removed from the matrix.

12. A non-transitory computer readable medium for managing a key of a user for a broadcast encryption, the computer readable medium including instructions, which when executed comprise: forming a tree including m hierarchies by repeating a process of setting an ith level including groups into each of which at least one node is grouped in a unit of ni, and setting a i+Ith level comprising groups into each of which the groups of the ith level are grouped in a unit of ni+b where i is from 1 to m−1, and users are mapped on nodes of the 1st level and a message provider is mapped on the mth level; detecting a revoked user among the users; mapping a key encryption key with respect to a group of the 1st level, the group of the 1st level including the revoked user, wherein the mapping of the key encryption key comprises removing the revoked user among the users based on a result of the detecting;

going from the 2nd level to the mth level of the m hierarchies for mapping key encryption keys with respect to at least one group of each level from the 2nd level to the mth level; and transmitting a message using the key encryption keys, wherein the mapping of the key encryption keys comprises:

forming a matrix having columns corresponding to groups of a level of the hierarchies and rows corresponding to a number of keys;

mapping virtual users and key encryption keys in the matrix; detecting a virtual user comprising a unauthorized user on a lower level to remove key encryption keys of the detected virtual user from the matrix; and selecting key encryption keys of the users remaining on the matrix after the key encryption keys of the detected virtual user are removed from the matrix.

* * * * *